(12) United States Patent
Moorti et al.

(10) Patent No.: US 7,813,374 B2
(45) Date of Patent: Oct. 12, 2010

(54) MULTIPLE PROTOCOL WIRELESS COMMUNICATION BASEBAND TRANSCEIVER

(75) Inventors: Rajendra Tushar Moorti, Mountain View, CA (US); Jason A. Trachewsky, Menlo Park, CA (US); Joachim S. Hammerschmidt, Mountain View, CA (US); Ling Su, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 1077 days.

(21) Appl. No.: 11/433,997

(22) Filed: May 15, 2006

(65) Prior Publication Data

US 2007/0002878 A1 Jan. 4, 2007

Related U.S. Application Data

(60) Provisional application No. 60/695,155, filed on Jun. 29, 2005.

(51) Int. Cl.
*H04J 3/22* (2006.01)
(52) U.S. Cl. .................................. 370/466; 370/476
(58) Field of Classification Search ......... 370/200–253, 370/272–309, 461–466, 431–546
See application file for complete search history.

(56) References Cited

U.S. PATENT DOCUMENTS

| 7,054,375 | B2* | 5/2006 | Kannan et al. ............. 375/260 |
|---|---|---|---|
| 2004/0082356 | A1* | 4/2004 | Walton et al. ............. 455/522 |
| 2004/0100897 | A1* | 5/2004 | Shattil ........................ 370/206 |
| 2005/0181728 | A1* | 8/2005 | Hansen et al. ............ 455/41.2 |
| 2006/0007908 | A1* | 1/2006 | Hosur et al. ............... 370/350 |
| 2006/0182017 | A1* | 8/2006 | Hansen et al. ............. 370/208 |

* cited by examiner

*Primary Examiner*—Ricky Ngo
*Assistant Examiner*—Iqbal Zaidi
(74) *Attorney, Agent, or Firm*—Garlick Harrison & Markison

(57) ABSTRACT

A multi-protocol wireless communication baseband transceiver includes a baseband transmit processing module and a baseband receive processing module. The baseband transmit processing module includes an encoding module, an interleaving module, a plurality of symbol mapping modules, a plurality of domain conversion modules, a plurality of cyclic prefix modules, a plurality of compensation modules, and a control module that is operably coupled to produce preamble set up information and payload set up information based on a mode of a plurality of protocol modes. The baseband receive processing module includes a plurality of receive compensation modules, a plurality of cyclic prefix removal modules, a plurality of receive domain conversion modules, an equalizing module, a plurality of demapping modules, a deinterleaving module, a decoding module, and a receive control module that is operably coupled to determine the mode from the plurality of protocol modes and the compensation control signals based on the at least one compensated stream of symbols.

20 Claims, 11 Drawing Sheets

MULTIPLE PROTOCOL WIRELESS COMMUNICATION BASEBAND TRANSCEIVER

This patent application is claiming priority under 35 USC §119 to a provisionally filed patent application entitled MULTIPLE PROTOCOL WIRELESS COMMUNICATION BASEBAND TRANSCEIVER, having a provisional filing date of Jun. 29, 2005, and a provisional Ser. No. of 60/695,155.

BACKGROUND OF THE INVENTION

1. Technical Field of the Invention

This invention relates generally to wireless communications and more particularly to multiple protocol wireless communication baseband transceivers.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO) and standards (e.g., IEEE 802.11, IEEE 802.11a, IEEE 802.11b, IEEE 802.11g, IEEE 802.11n, extensions and modifications thereof), a large number of combination of types and standards is possible. For a manufacturer of radio frequency transceiver integrated circuits (ICs) to provide ICs for a majority of the combination of standards and types, the manufacturer must produce a significant number of ICs, which is a costly endeavor.

Therefore, a need exists for a multiple protocol wireless communication baseband transceiver that is capable of processing multiple combinations of standards and types of wireless communications when embodied in an integrated circuit(s).

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
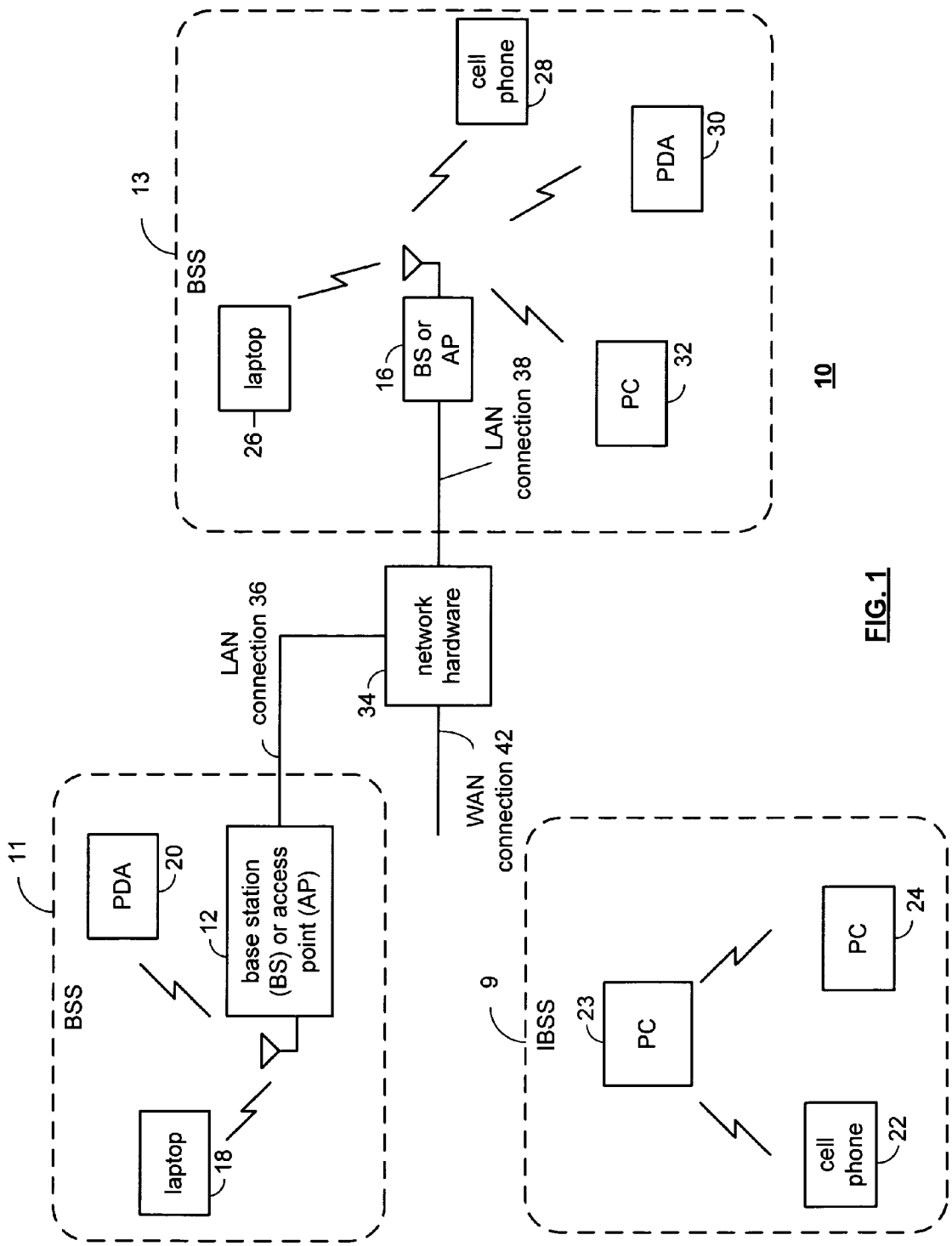
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
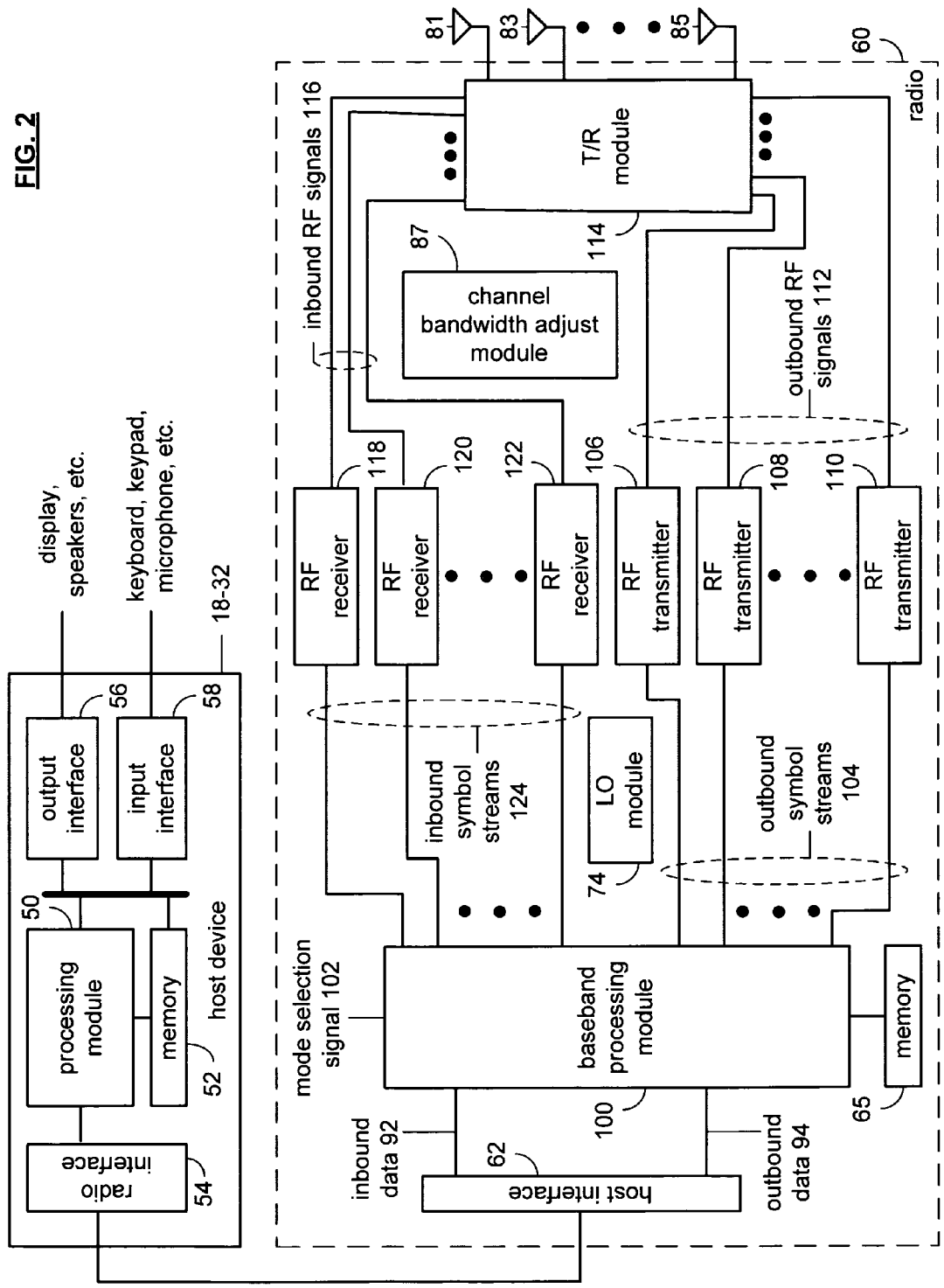
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The functionality of the processing module 100 will be described in greater detail with reference to FIGS. 3-11.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 (e.g., 1 to n) produced by the baseband module 100, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 2 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 3:
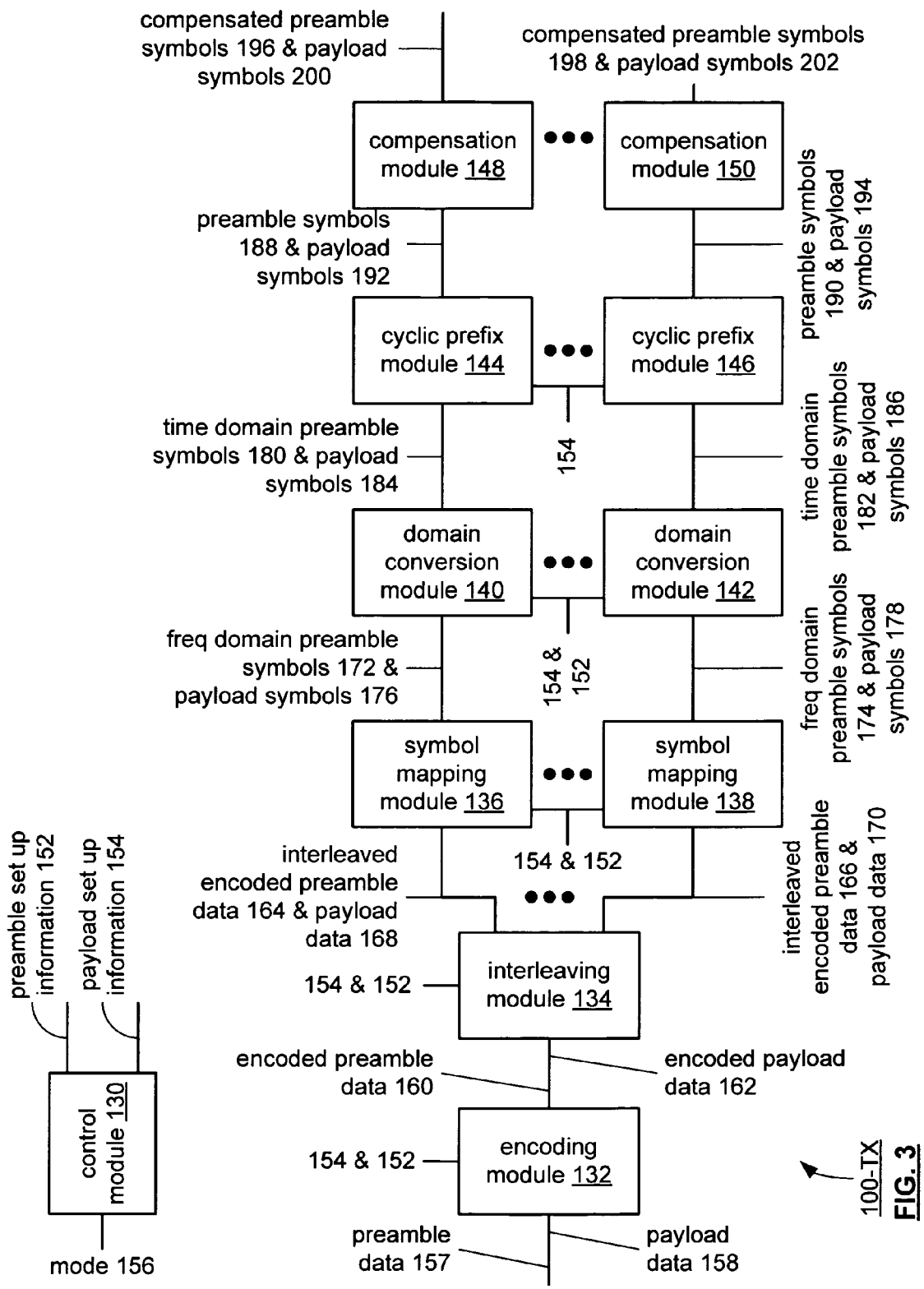
FIG. 3 is a schematic block diagram of a baseband transmit processing module in accordance with the present invention.

FIG. 3 is a functional schematic block diagram of a baseband transmit processing module 100-TX that includes a control module 130, encoding module 132, interleaving module 134, a plurality of symbol mapping modules 136, 138, a plurality of domain conversion modules 140, 142, a plurality of cyclic prefix modules 144, 146, and a plurality of compensation modules 148, 150.

The baseband transmit processing module 100-TX functions to convert outbound data 94 into a plurality of outbound symbol streams 104 wherein the outbound data 94 is represented by payload data 158 and the outbound symbol streams 104 include at least a version of the compensated preamble symbols 196, 198 and compensated payload symbols 200, 202. In operation, the control module 130, based on a mode 156 of a plurality of protocol modes, generates preamble setup information 152 and payload setup information 154. The protocol modes include two or more of IEEE 802.11, IEEE 802.11a, IEEE 802.11b, IEEE 802.11g, IEEE 802.11n, any other current or future versions of IEEE 802.11, and/or any other wireless communication protocols and versions thereof.

Based on the preamble setup information 152 and the payload setup information 154, the baseband transmit processing module 100-TX is configured to support the corresponding wireless communication protocol. For example, if the mode 156 is IEEE 802.11a, the baseband transmit processing module 100-TX is configured to support IEEE 802.11a transmissions. Accordingly, for IEEE 802.11a only one of each of the plurality of symbol mapping modules 136, 138, down conversion modules 140, 142, cyclic prefix modules 144, 146 and compensation modules 148, 150 would be activated. As another example, if the particular protocol mode is IEEE 802.11n for a 2×2 MIMO wireless communication, the baseband transmit processing module 100-TX would be configured to support 2×2 MIMO wireless transmissions. In this mode, two symbol mapping modules 136, 138, two domain conversion modules 140, 142, two cyclic prefix modules 144, 146 and two compensation modules 148 and 150 would be activated for the 2×2 MIMO communication.

In operation, at the beginning of generating a frame for a wireless communication, the encoding module 132 may receive preamble data 157, which may include frame header information, preamble information or any portion thereof. In accordance with the preamble setup information 152, the encoding module 132 encodes the preamble data 157 to produce encoded preamble data 160. The interleaving module 134 processes the encoded preamble data 160 in accordance with the preamble setup information 152 to produce one or more streams of interleaved encoded preamble data 164 and/or 166. For example, for a MIMO transmission, the number of streams of interleaved encoded preamble data 164, 166 will correspond to the number of transmit paths in the MIMO transmission. As one of ordinary skill in the art will appreciate, the interleaving module 134, in accordance with the preamble setup information 152, may interleave the encoded preamble data in accordance with an interleaving convention of the corresponding standard or may pass the encoded data uninterleaved as the interleaved encoded preamble data 164 or 166.

The symbol mapping module 136 and/or 138 receives the interleaved encoded preamble data 164 and/or 166 and generates frequency domain preamble symbols 172 and/or 174 therefrom. The frequency domain preamble symbols 172, 174 may be in accordance with the particular mode 156 as dictated by the preamble setup information 152. For example, for IEEE 802.11a, the preamble symbols may include a PLCP (physical layer conversion procedure) header, a PSDU (PLCP service data unit) field, a tail field, a pad field, a PLCP preamble that includes 12 symbols, a coded OFDM (orthogonal frequency division multiplex) symbol having a BPSK (binary phase shift keying) rate equal to one-half, wherein the header includes fields for rate, length, parity and service.

The domain conversion module 140 and/or 142 convert the frequency domain preamble symbols 172 and/or 174 into time domain preamble symbols 180 and/or 182. The time domain conversion modules 140, 142 may be implemented as inverse fast Fourier transforms (IFFT). The cyclic prefix modules 144 and/or 146 add a cyclic prefix to the frame once the data has been created. Thus, with respect to the preamble symbols 188 and 190, the cyclic prefix module 144 and/or 146 passes them to the compensation module 148 and/or 150. The compensation module 148 and/or 150 performs one or more of baseband scaling, in-phase and quadrature imbalance compensation and/or pre-emphasis on the symbols it receives from the cyclic prefix modules 144, 146. With respect to the preambles, the compensation module 148 and 150 produce compensated preamble symbols 196 and/or 198.

With the preamble created or being created, the baseband transmit processing module 100-TX also processes payload data 158. The encoding module 132, based on the payload setup information 154 (which may include an encoding scheme, puncture rate, data rate, et cetera), encodes the payload data 158 to produce encoded payload data 162. The interleaving module 134 receives the encoded payload data 162 and, based on the payload setup information 154, produces one or more streams of interleaved payload data 168, 170. With respect to the interleaving module 134, the payload setup information 154 indicates the number of streams of interleaved payload data 168 and 170 to create and may further indicate the particular type of interleaving to be performed. In one embodiment, the interleaving is done in accordance with the particular wireless protocol as indicated by mode 156.

One or more of the symbol mapping modules 136, 138 are activated to map the interleaved encoded payload data 168 and/or 170 to symbols in the frequency domain to produce frequency domain payload symbols 176 and/or 178. The symbol mapping is done in accordance with the payload setup information 154 which, based on mode 156, indicates the particular constellation to which the payload data is to be mapped. For example, the symbol mapping may be done in accordance with BPSK, QPSK (quadrature phase shift keying), 16 QAM (quadrature amplitude modulation), 64 QAM, 256 QAM, et cetera.

One or more of the domain conversion modules 140, 142 is activated to convert the frequency domain, payload symbols 176 and/or 178 into time domain payload symbols 184 and/or 186. In one embodiment, each of the domain conversion modules 140, 142 includes an inverse fast Fourier transform module.

One or more of the cyclic prefix modules 144 and/or 146 are activated to add a cyclic prefix to the frame containing the preamble and payload symbols to produce preamble symbols 188 and payload symbols 192 and/or preamble symbols 190 and payload symbols 194. One or more of the compensation modules 148 and/or 150 is activated to compensate the payload symbols 192 and/or 194 to produce compensated payload symbols 200 and/or 202. The compensation performed by the compensation modules 148 and/or 150 include baseband scaling, IQ imbalance compensation, pre-emphasis, et cetera.

Figure 4:
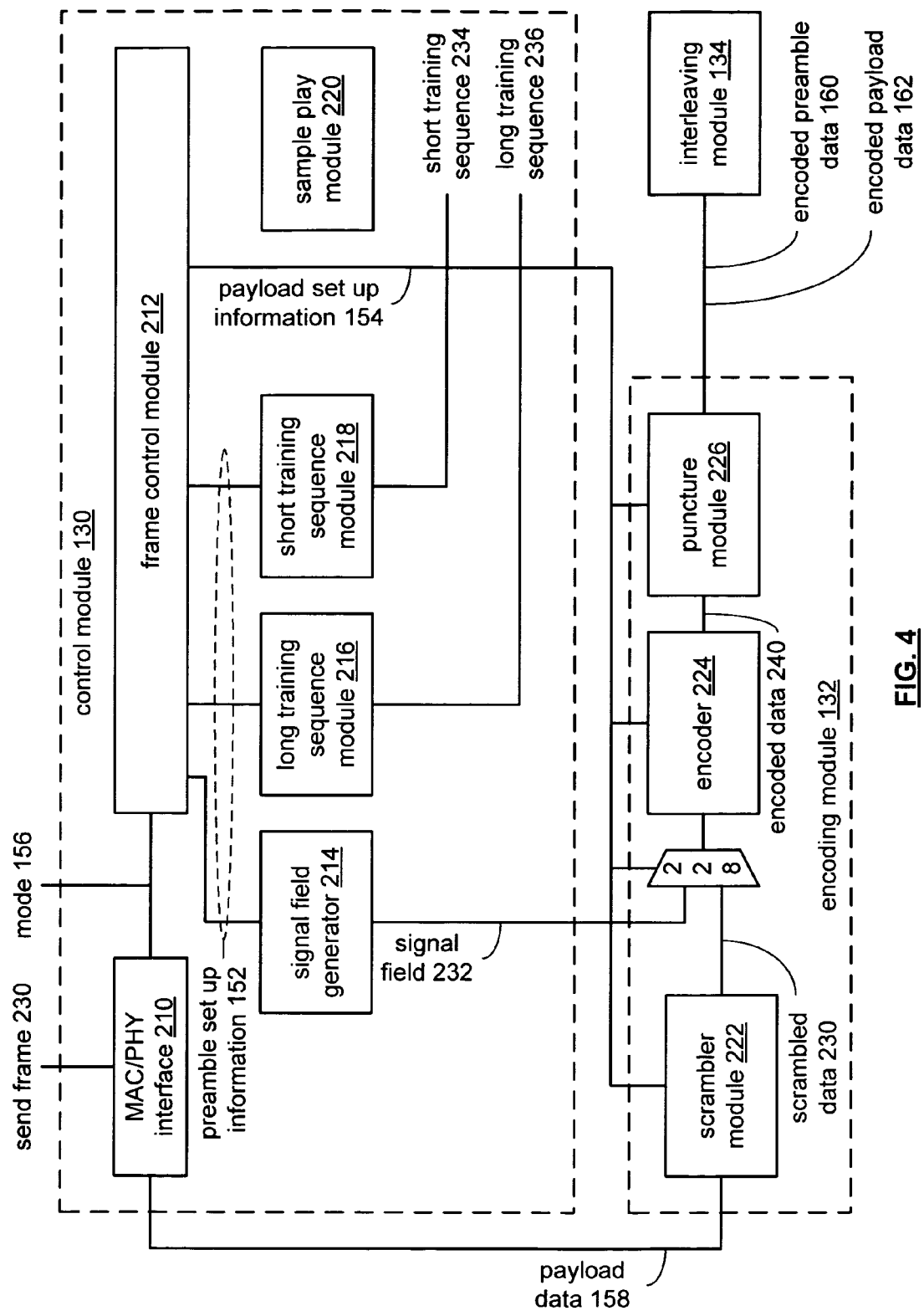
FIG. 4 is a schematic block diagram of a portion of a baseband transmit processing module in accordance with the present invention.

FIG. 4 is a more detailed schematic block diagram of a portion of the baseband transmit processing module 100-TX. In this illustration, the control module 130 and the encoding module 132 are shown in greater detail. The control module 130 includes a medium access control (MAC)/physical (PHY) interface 210, a frame control module 212, a signal field generator 214, a long training sequence module 216, a short training sequence module 218 and a sample play module 220. The encoding module 132 includes a scrambler module 222, an encoder 224, a puncture module 226 and may include a multiplexer 228.

In operation, with respect to generating the preamble and in accordance with the mode 156, the frame control module 212 enables the signal field generator 214 to generate a signal field 232 that corresponds to the particular mode 156. For example, the signal field may be generated in accordance with IEEE 802.11a, g, n, and/or any other wireless communication protocol. In this embodiment, the signal field 232 is included within the preamble data 157.

In accordance with the payload and/or preamble setup information 152, 154, the encoding module 224 encodes the signal field 232 to produce the encoded signal field. The puncture module 226 may puncture the encoded signal field to produce the encoded preamble data 160. Alternatively, the puncture module 226 may be bypassed with respect to the encoded preamble data.

The MAC/PHY interface 210, based on the mode 156 and/or a send frame signal 230, provides the payload data 158 to the scrambler module 222. In accordance with the payload setup information 154, which may dictate a particular mode of scrambling (e.g., scrambler in accordance with the one or more scrambling options per IEEE 802.11a, b, g, n, et cetera), the scrambler module 222 scrambles the payload data 158 to produce scrambled data 230. Multiplexer 228 passes the scrambled data 230 to encoder 224 which encodes, in accordance with the payload setup information 154, the scrambled data 230 to produce encoded data 240. In one embodiment, the encoder 224 may be a convolutional encoder that encodes data in accordance with the particular mode 156 as dictated by the payload setup information 154. The puncture module 226 punctures at a rate indicated by the payload setup information 154 the encoded data 240 to produce the encoded payload data 162.

The long training sequence 216, the short training sequence 218 and the signal field generator 224 receive inputs from the control module 212, which may be collectively referred to as the preamble setup information 152. Based on the preamble setup information 152, the signal field generator 214 generates the signal field 232 as previously described.

The long training sequence 216 and short training sequence module 218 generate a long training sequence 236 and a short training sequence 234, respectively, based on the preamble setup information 152. The preamble setup information dictates to modules 216 and 218, the particular type of training sequences 234 and 236 to generate. For example, if the mode 156 corresponds to IEEE 802.11a, the short training sequence 234 and long training sequence 236 are generated in accordance therewith. If, however, the mode 156 corresponds to IEEE 802.11n and/or some other MIMO wireless communication protocol, the short and long training sequences 234 and 236 are generated for the multiple transmit paths as discussed in one or more co-pending patent applications including FRAME FORMAT FOR HIGH DATA THROUGHPUT WIRELESS LOCAL AREA NETWORK TRANSMISSIONS having a Ser. No. of 10/778,751, and a filing date of Feb. 13, 2004; CONFIGURING A MIMO COMMUNICATION having a Ser. No. of 10/973,549, and a filing date of Oct. 26, 2004; PREAMBLE FORMATS FOR MIMO WIRELESS COMMUNICATIONS having a Ser. No. of 10/973,595, and a filing date of Oct. 26, 2004; MIMO WIRELESS COMMUNICATION GREENFIELD PREAMBLE FORMATS having a Ser. No. of 10/973,212, and a filing date of Oct. 26, 2004; TRANSMISSION OF WIDE BANDWIDTH SIGNALS IN A NETWORK HAVING LEGACY DEVICES having a Ser. No. of 10/973,612, and a filing date of Oct. 26, 2004; SIGNALING FORMAT FOR WLANS having a Ser. No. of 10/973,611, and a filing date of Oct. 26, 2004; and MIXED MODE PREAMBLE FOR MIMO WIRELESS COMMUNICATIONS having a Ser. No. of 11/079,962, and a filing date of Mar. 15, 2005.

In one embodiment, the long training sequence module 216 and the short training sequence module 218 are each lookup tables that are addressed based on the preamble setup information 152 to retrieve the appropriate short and long training sequences 234 and 236. Similarly, the signal field generator 214 may be a lookup table to produce the signal field 232 or a state machine to produce the signal field 232. The frame control module 212 may be implemented as a state machine to produce the corresponding preamble setup information 152 and payload setup information 154.

The control module 130, via the frame control module 212, generates the preamble setup information 152 and payload setup information 154 for a variety of modes 156. For example, the control module 130 may generate a first preamble set up information and a first payload set up information when the mode is an IEEE 802.11b mode of the plurality of protocol modes. In this mode, the first preamble set up information includes at least one of a synchronization field, a start of frame delimiter, a signal field, a service field, and a length field in accordance with the IEEE 802.11b, and wherein the first payload set up information includes transmit power. As another example, the control module 130 may generate a second preamble set up information and a second payload set up information when the mode is an IEEE 802.11a mode of the plurality of protocol modes. In this mode, the second preamble set up information includes at least one of a short training sequence, a long training sequence, a signal field, a service field, and a frame length field in accordance with the IEEE 802.11a and wherein the second payload set up information includes transmit power, encoding scheme, puncture rate, data rate, modulation scheme, and path selection.

In yet another example, the control module 130 may generate a third preamble set up information and a third payload set up information when the mode is an IEEE 802.11g mode of the plurality of protocol modes. In this mode, the third preamble set up information includes at least one of a short training sequence, a long training sequence, a signal field, a service field, and a frame length field in accordance with the IEEE 802.11g and wherein the second payload set up information includes transmit power, encoding scheme, puncture rate, data rate, modulation scheme, and path selection. In a further example, the control module 130 may generate a fourth preamble set up information and a fourth payload set up information when the mode is a MIMO mode of the plurality of protocol modes, wherein the fourth preamble set up information includes at least one of a short training sequence, a long training sequence, a signal field, a service field, and a frame length field in accordance with the MIMO mode and wherein the second payload set up information includes transmit power, encoding scheme, puncture rate, data rate, modulation scheme, number of transmit paths, and path selection.

Figure 5:
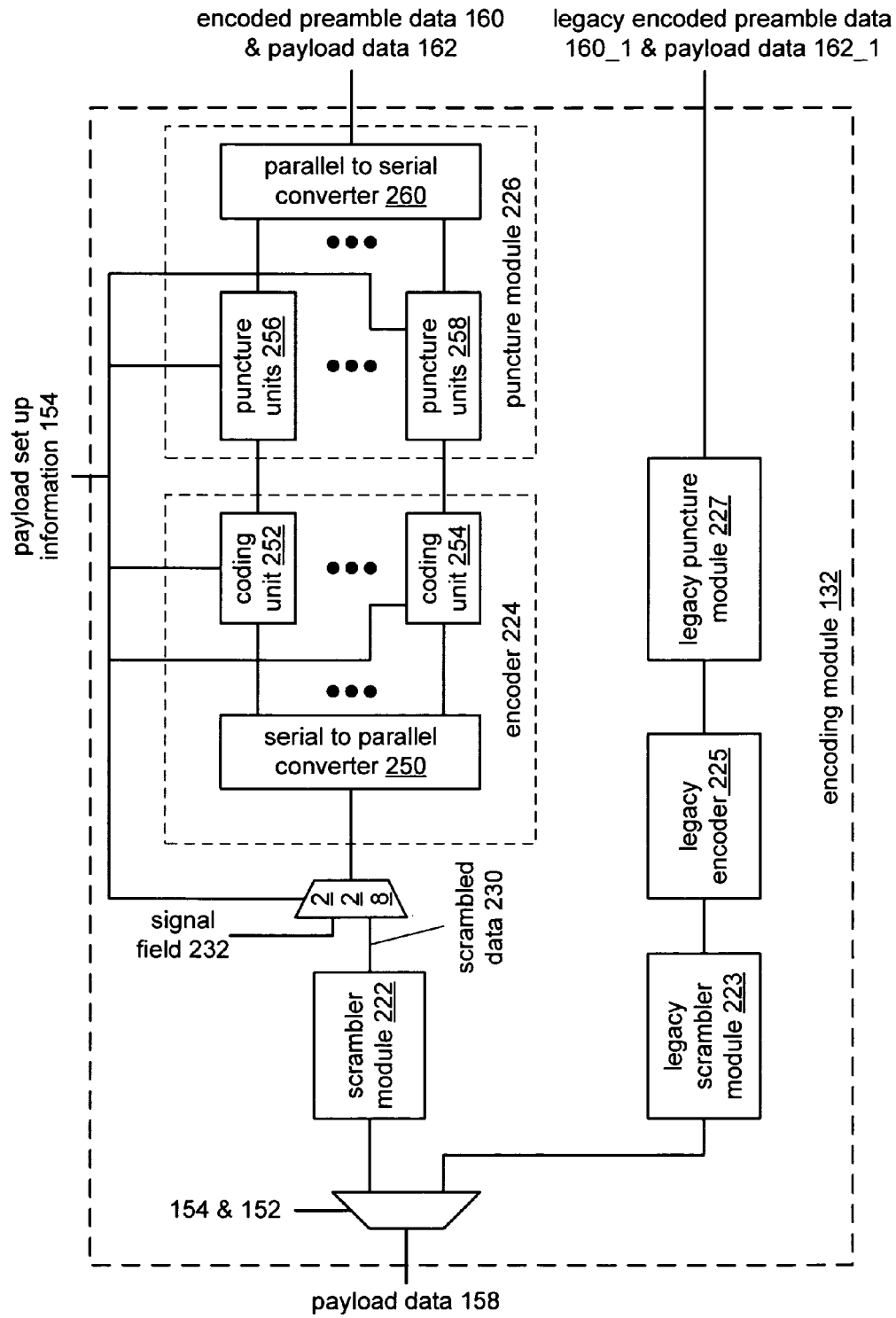
FIG. 5 is a schematic block diagram of another portion of a baseband transmit processing module in accordance with the present invention.

FIG. 5 is a schematic block diagram of an embodiment of encoding module 132 that includes the scrambler module 222, multiplexer 228, the encoder 224, the puncture module 226, a demultiplexer, a legacy scrambler module 223, a legacy encoder 225 and a legacy puncture module 227. The encoder 224 includes a serial-to-parallel converter 250 and a plurality of coding units 250-254. The puncture module 226 includes a plurality of puncture units 256, 258 and a parallel-to-serial converter 260.

In operation, and in accordance with the payload setup information 154, when the mode 156 corresponds to IEEE 802.11b, the legacy path, which includes legacy scrambler module 223, legacy encoder 225 and legacy puncture module 227, is enabled while the other path is disabled. In this embodiment, the demultiplexer provides the payload data 158 to the legacy path to produce the legacy encoded payload data 162-1. In addition, the legacy path may be activated to produce the legacy encoded preamble data 160-1.

For other modes 156, the legacy path is disabled and the other path is enabled. In this mode, the demultiplexer provides the payload data 158 to scrambler module 222. The scrambler module 222 scrambles the payload data 158 in accordance with the payload setup information 154 to produce scrambled data 230. The serial-to-parallel converter 250 receives the scrambled data and converts the serial stream of scrambled data 230 into a plurality of streams of scrambled data. Each of the streams of scrambled data is provided to a corresponding coding unit 252, 254, which may be a convolutional encoder. Each coding unit 252, 254, if activated in accordance with the payload setup information 154, encodes its corresponding stream of scrambled data to produce a stream of encoded data.

Each of the puncture units 256, 258 punctures the corresponding stream of encoded data to produce a stream of punctured data. The parallel-to-serial converter 260 converts the plurality of streams of punctured data into the encoded payload data 162. In addition, the encoder 224 and puncture module 226 may process the signal field 232 via the multiple paths to produce the encoded preamble data 160. Alternatively, only one path through the encoder 224 and puncture module 226 may be activated to encode the signal field 232.

Figure 6:
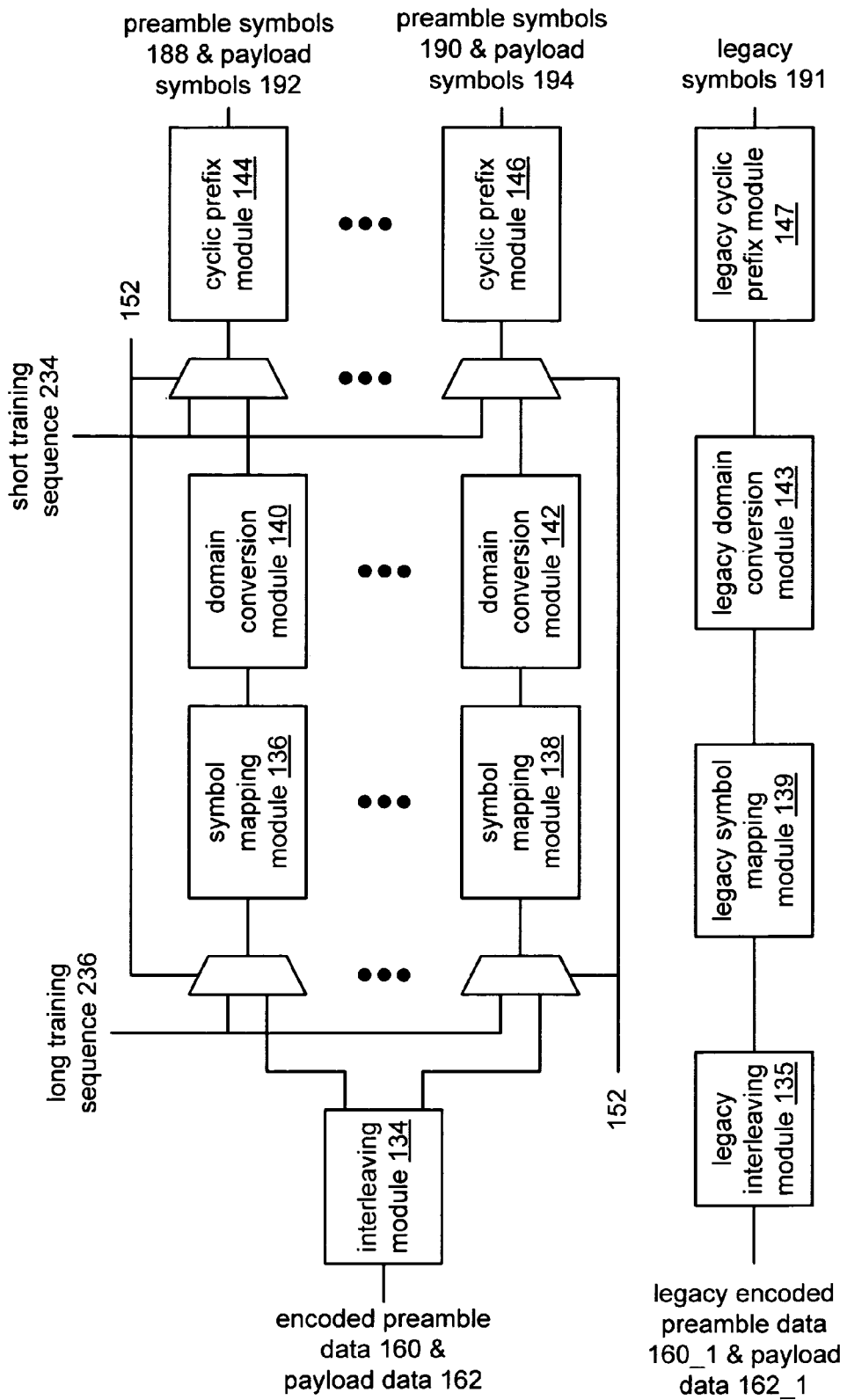
FIG. 6 is a schematic block diagram of yet another portion of a baseband transmit processing module in accordance with the present invention.

FIG. 6 is a schematic block diagram of another portion of the baseband transmit module 100-TX. In this illustration, the legacy path continues and includes a legacy interleaving module 135, a legacy symbol mapping module 139, a legacy domain conversion module 143 and a legacy cyclic prefix module 147. The legacy path converts the legacy encoded preamble data 160-1 and payload data 162-1 into a legacy symbol 191 in accordance with the IEEE 802.11b wireless protocol. Accordingly, when the legacy path is enabled, the other path or paths are disabled.

When the legacy path is disabled, the other path or paths is/are enabled. The other paths include the interleaving module 134, a plurality of multiplexers, symbol mapping modules 136, 138, down conversion modules 140, 142 and cyclic prefix modules 144, 146. As one of ordinary skill in the art will appreciate, the number of symbol mapping modules 136, 138, down conversion modules 140, 142 and cyclic prefix modules 144, 146 will correspond to the number of transmit paths needed to support the particular mode 156. For example, if the mode 156 corresponds to IEEE 802.11a or g, only one path is activated. Conversely, when the mode 156 corresponds to IEEE 802.11n, a proprietary MIMO convention, and/or any other type of public-accessible MIMO wireless communication standard, the number of paths activated correspond to the number of transmit antennas. For example, for a 2×2 MIMO transmit wireless communication, 2 transmit paths are enabled.

To process the preamble, the multiplexers are enabled to provide the long training sequence 236 to the symbol mapping modules 136, 138. Accordingly, the symbol mapping modules map the long training sequence 236 to corresponding symbols. The symbol mapped long training sequences are then converted from the frequency domain to the time domain by the corresponding domain conversion modules 140, 142, which may be IFFT modules. The $2^{nd}$ grouping of multiplexers, in accordance with the preamble setup information 152 provide the short training sequences 234 to the cyclic prefix module 144, 146 as part of the preamble symbols and subsequently provides the time domain symbols of the long training sequence 236 to the cyclic prefix modules 144 and 146. In addition, the multiplexers provide the payload data to the corresponding modules 136-146 to produce the payload symbols 192 and 194.

Figure 7:
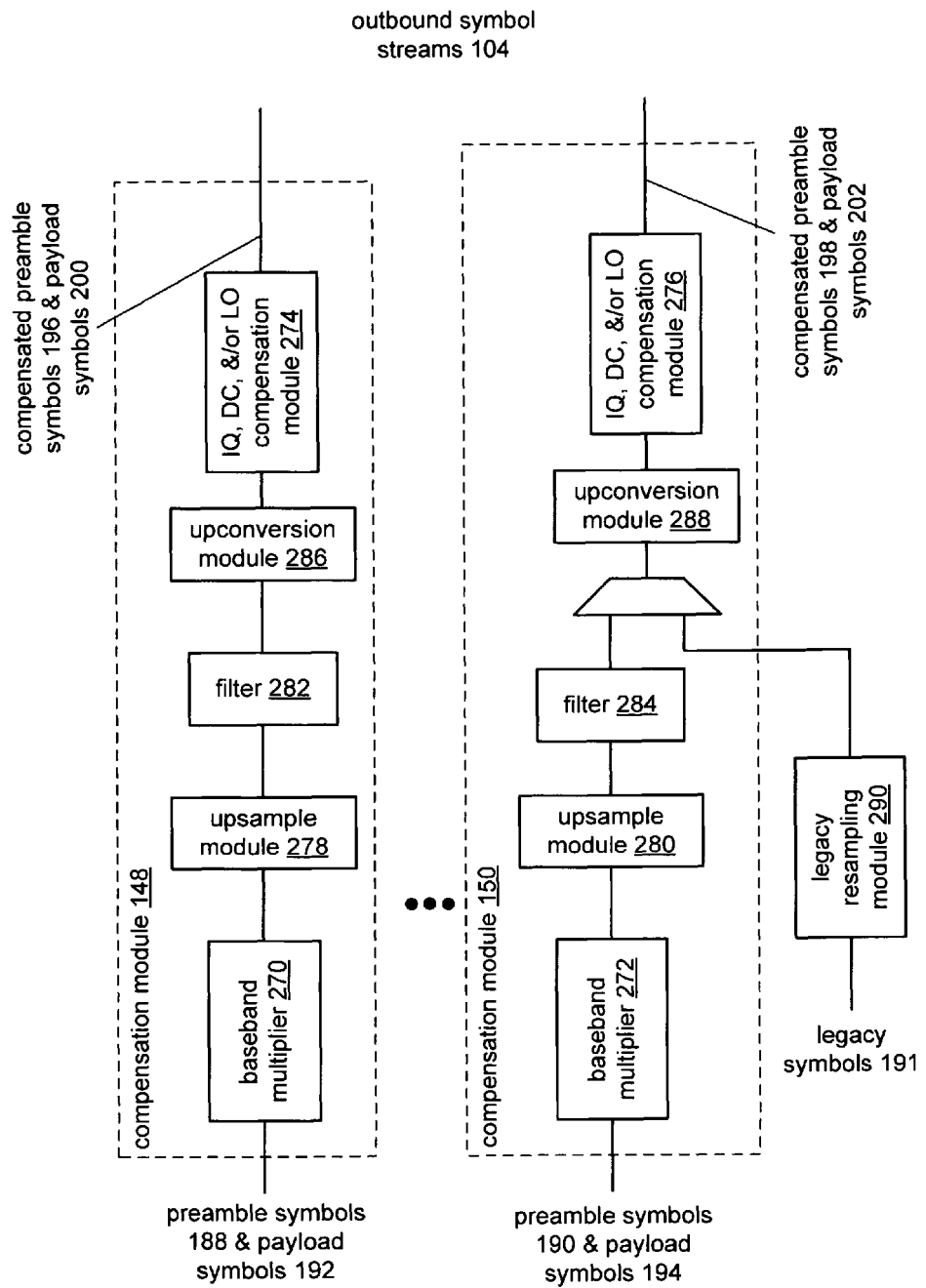
FIG. 7 is a schematic block diagram of a further portion of the baseband transmit processing module in accordance with the present invention.

FIG. 7 illustrates yet another portion of the baseband transmit processing module 100-TX. In this illustration, the compensation modules 148, 150 are shown to include baseband multipliers 270, 272, IQ, DC, and/or LO compensation modules 274, 276 up-sampling modules 278, 280, filters 282, 284, a multiplexer, up-conversion modules 286, 288, a legacy IQ compensation module 275, and a legacy resampling module 290.

When the legacy mode is enabled (e.g., IEEE 802.11b), the legacy resampling modules 290 is activated to process the legacy symbols 191. The multiplexer provides the processed legacy symbols 191 to the up-conversion module 288 as the outbound symbol stream 104. In this instance, the outbound symbol stream 104 only includes one path which is provided to a corresponding RF transmitter for subsequent transmission as an RF signal.

In other modes, the legacy path is disabled and the other path is enabled based on the number of transmit paths needed for the particular mode 156. Each of the baseband multipliers 270, 272 multiply the preamble symbols 188 and payload symbols 192, 194 with a scaling factor to provide a desired level of the corresponding symbols 188, 190, 192 and 194.

The upscale modules 278, 280 process the compensated symbols 196, 198, 200 and 202 by adjusting the sample rate of the corresponding symbols to a higher rate, which may be in the range of 44 MHz to 80 MHz or greater. The filters 282, 284 are bandpass filters to filter unwanted signal components of the up-sampled symbols 196, 198, 200 and 202.

The up-conversion modules 286, 288 adjust the frequency of the symbols to compensate for variations in channel width. For example, a 40 MHz channel may be deemed to be the default channel width such that the center of the 40 MHz channel is deemed to be the center of the channels. If, however, the particular mode includes a 20 MHz channel, the center frequency needs to be adjusted to be centered within the 20 MHz channel. In general, a 40 MHz channel will include two adjacent 20 MHz channels, thus, necessitating the adjustment of the center channel. A similar adjustment would need to be made for a 10 MHz channel. Conversely, a 20 MHz channel may be deemed to be the default channel bandwidth where adjustments would need to be made for 40 MHz channels and/or 10 MHz channels.

The IQ, DC, and/or LO compensation modules 274, 276 compensate for IQ imbalances, DC offsets, and/or LO leakage within the symbols 188, 190, 192 and 194 to produce compensated preamble symbols 196, 198 and compensated payload symbols 200, 202. IQ compensation may be done in a variety of ways as are known in the art. The resulting symbols may be referred to as the outbound symbol streams 104, which include the preamble symbols and payload symbols. The RF transmitter sections convert the outbound symbol streams 104 into RF signals that are subsequently transmitted to one or more other RF transceivers.

Figure 8:
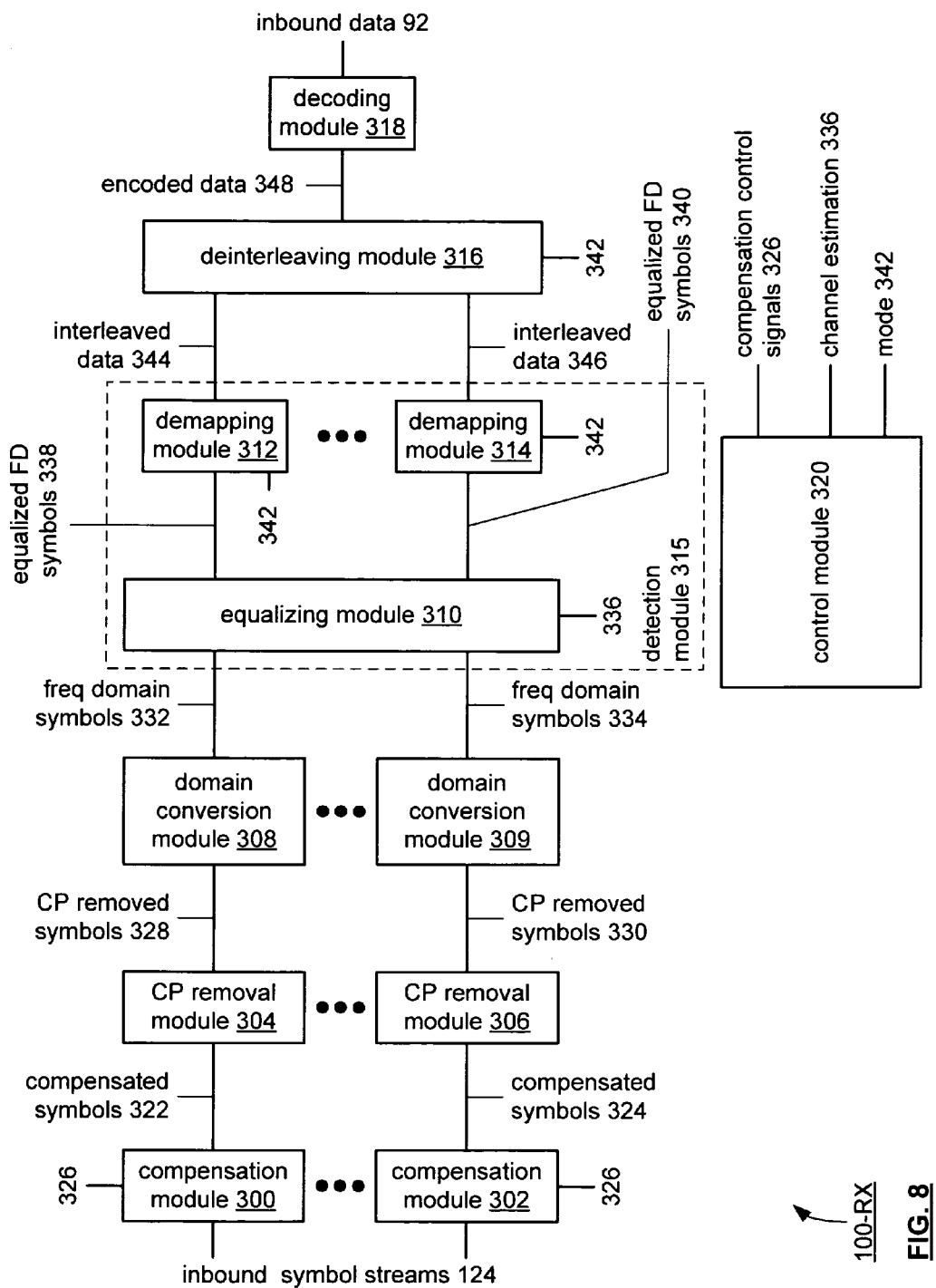
FIG. 8 is a schematic block diagram of a baseband receive processing module in accordance with the present invention.

FIG. 8 is a schematic block diagram of a baseband receive processing module 100-RX that includes a plurality of compensation modules 300, 302, cyclic prefix (CP) removal modules 304, 306, down-conversion modules 308, 309, a detection module 315 (which, in one embodiment includes an equalizing module 310 and a plurality of demapping modules 312, 314 and in another embodiment, includes a maximum likelihood detector), a deinterleaving module 316, decoding module 318 and a control module 320. As one of ordinary skill in the art will appreciate, the number of compensation modules 300, 302, CP removal modules 304, 306, down-conversion modules 308, 309, and demapping modules 312, 314 that are activated are depending on the particular mode 156 of the transceiver. For example, for an IEEE 802.11a wireless communication, only one of each of the respective modules would be activated. Alternatively, if the mode 156 corresponds to a 4×4 MIMO transmission, four of each of the modules would be activated to support the particular communication.

In this embodiment, the control module 320 is operably coupled to determine compensation control signals 326, channel estimation 336 and the mode 342 from the received inbound symbols 124. The functionality of control module 320 will be described in greater detail with reference to FIGS. 9-11.

The compensation modules 300, 302 receive the inbound symbol streams 124 and, in accordance with the compensation control signal 326 compensates the inbound stream of symbols 124 to produce compensated symbols 322, 324. The compensation may include DC offset adjustment, IQ imbalance adjustment, frequency correction, phase correction and/or filtering. The IQ imbalance adjustment may be performed in accordance with the teachings of co-pending patent application Ser. No. 11/434,379 entitled RX The CP removal modules 304, 306 are operably coupled to remove the cyclic prefixes from the compensated symbols 322 and/or 324 to produce CP remove symbols 328, 330. The domain conversion modules 308, 309, which may be fast Fourier transform modules, convert the time domain CP remove symbols 328, 330 to frequency domain symbols 332, 334.

The equalizing module 310 in accordance with the channel estimation 336, equalizes the frequency domain symbols 332, 334 to produce equalized frequency domain (FD) symbols 338, 340. Such equalization may be done in accordance with the teachings of a co-pending patent application Ser. No. 11/525,270 entitled MAXIMUM LIKELIHOOD DETECTION FOR MIMO RECEIVERS.

The demapping modules 312, 314 are operably coupled to demap in accordance with the mode 342 the equalized frequency domain symbols 338, 340 to produce interleaved data 344, 346. The demapping modules 312, 314 function in accordance with the particular wireless protocol selected. For example, if the particular wireless protocol is IEEE 802.11a, one of the demapping modules functions in accordance with the particular constellation mapping as indicated within the preamble of the packet received. Conversely, if the mode 156 is for a MIMO wireless communication, each of the demapping modules is activated to demap the symbols 338, 340 to retrieve the appropriate data.

The deinterleaving module 316, in accordance with the mode 342, deinterleaves the interleaved data 344, 346 to produce encoded data 348. The decoding module 318 decodes the encoded data 348 to produce the inbound data 92.

Figure 9:
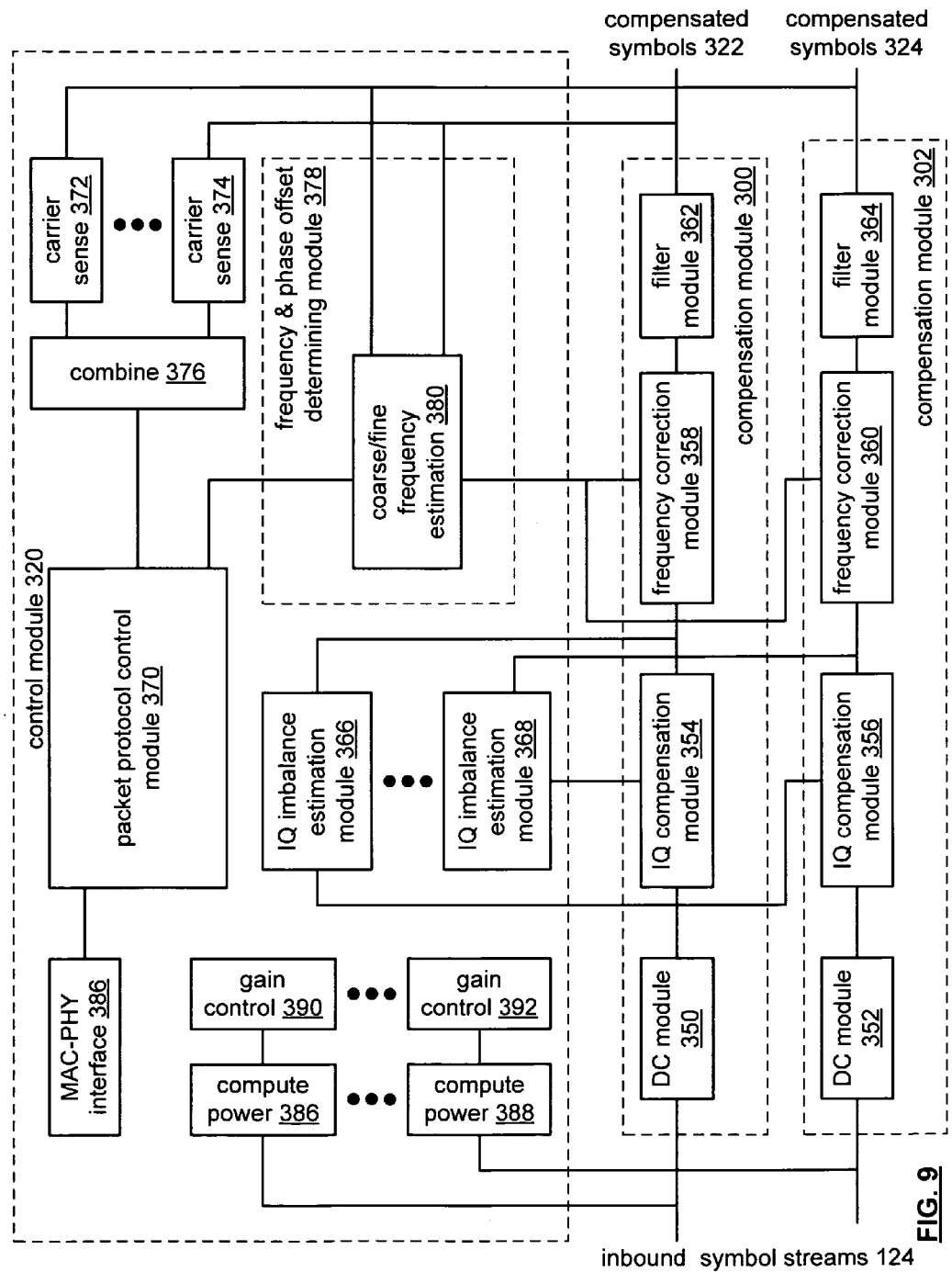
FIG. 9 is a schematic block diagram of a portion of a baseband receive processing module in accordance with the present invention.

FIG. 9 is a functional schematic block diagram of a portion of the baseband receive processing module 100-RX that includes the control module 320 and compensation modules 300, 302 in greater detail. The control module 320 includes a packet protocol control module 370, a plurality of carrier sense modules 372, 374, a combining module 376, a frequency and phase offset determining module 378, a coarse/fine frequency estimation 380, a plurality of IQ imbalance estimation modules 366, 368, a MAC/PHY interface 386, a plurality of compute power modules 386, 388 and a plurality of gain control modules 390, 392. Each of the compensation modules 300, 302 include a DC offset module 350, 352, IQ compensation module 354, 356, frequency correction module 358, 360, and a filter module 362, 364.

The compute power modules 386, 388 receive the inbound symbol stream 124 and compute the power of each of the symbol streams 124 using one of a variety of techniques. For example, one power measurement technique is to compute the received signal strength based on the magnitude of the in-phase component and the magnitude of the quadrature component. The gain control modules 390, 392 interpret the corresponding power to establish the gain for an automatic gain control loop of the plurality of receiver sections 118-122 of FIG. 2.

The IQ imbalance estimation modules 366, 368 are each operably coupled to determine an IQ imbalance within each of the received paths. The IQ imbalance estimation modules 366, 368 monitor the output of the IQ compensation modules 354, 356 and determine the corresponding IQ imbalance there from. The IQ imbalance may be determined in a variety of ways including the ones disclosed in co-pending patent application Ser. No. 11/434,379 RX IMBALANCE ESTIMATION. The coarse/fine frequency estimation module 380, based on information provided by the packet control module 370, monitors the compensated symbols 322, 324 to determine frequency differences between the received signal and the clocking circuitry of the baseband receive processing module 100-RX. The information provided by the packet protocol modules 370 corresponds to the desired packet format for example, OFDM packet format and the channel bandwidth, and the number of tones-per-channel. For example, the channel bandwidth may be 20 MHz including 64 OFDM tones-per-channel. Alternatively, the channel bandwidth may be 40 MHz and the channel may include 128 tones-per-channel. Accordingly, the coarse/fine frequency estimation module 380 determines the frequency difference and provides a correction signal to frequency correction modules 358, 360.

The frequency correction module 358, 360 compensate for frequency differences to produce frequency compensated symbols. The filter modules 362, 364 filter the frequency compensated signals to produce the compensated symbols 322, 324.

The carrier sense modules 372, 374 monitor each of the streams of compensated symbols 322, 324 to detect the presence of a valid signal. Carrier sense is typically done in the first stages of a preamble thus, each carrier sense module 372, 374 is monitoring received signals to determine whether the received signals correspond to preambles of a frame of a particular wireless communication protocol. The combining module 376 combines the outputs of the carrier sense modules 372, 374 and provides it to the packet protocol control module 370.

The packet protocol control module 370 which is described in greater detail in co-pending patent application Ser. No. 11/301,522 entitled PROGRAMMABLE MIMO RECEIVER PACKET PROCESSING, interprets the received information from the combining module 376 to determine the particular mode 342 that corresponds to the frame. For example, the received frame may be in accordance with one of a plurality of wireless protocol formats including, but not limited to IEEE 802.11a, b, g, n, et cetera. From this information, the packet protocol control module 370 generates the mode 342 such that the baseband receive processing module 100-RX may appropriately process the received inbound symbol streams 124.

In addition, the packet protocol control module 370 provides an indication of the mode to the MAC/PHY interface 386 such that the MAC/PHY interface may provide the recovered information to the MAC layer of the wireless communication device.

Figure 10:
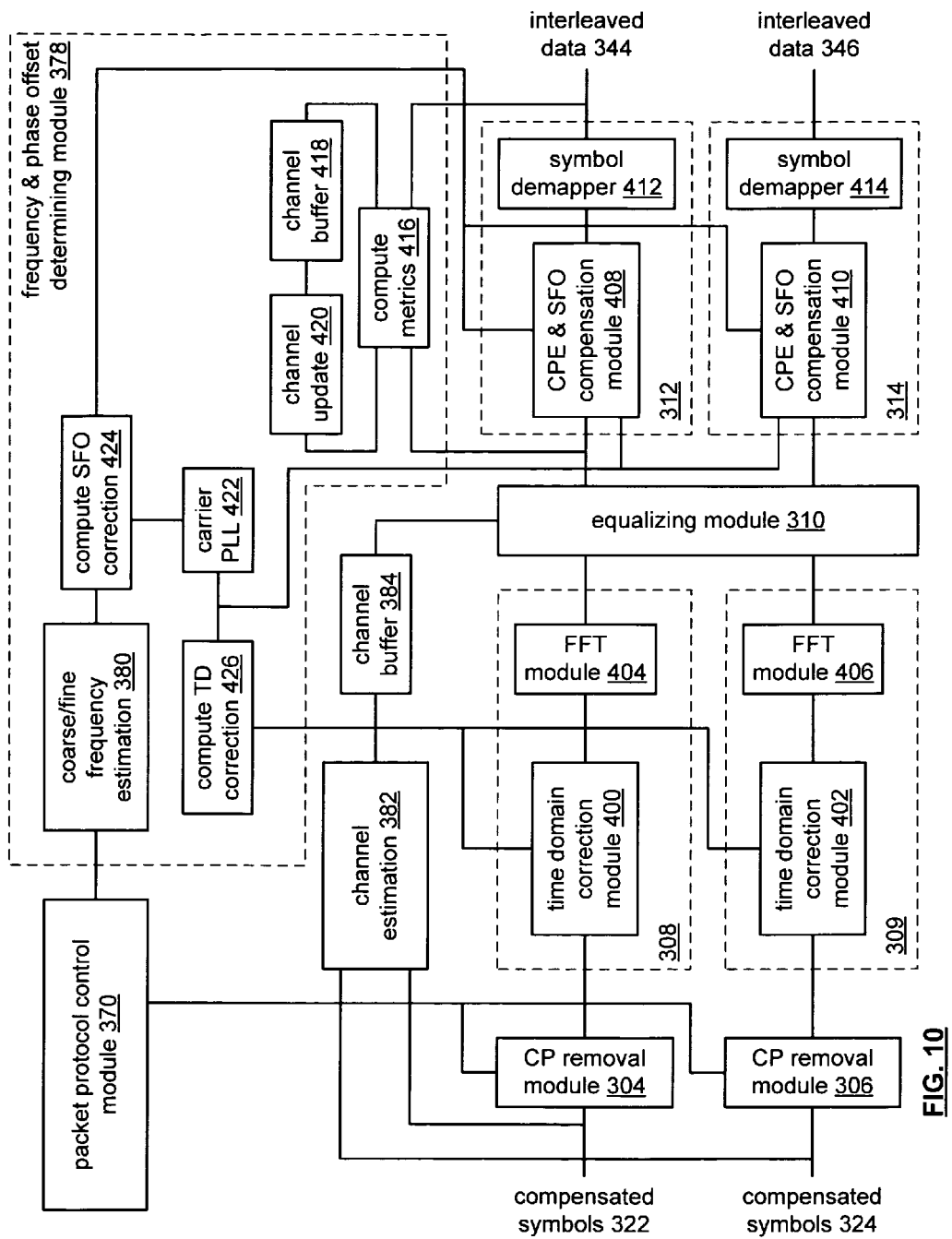
FIG. 10 is a schematic block diagram of another portion of a baseband receive processing module in accordance with the present invention.

FIG. 10 is a schematic block diagram of another portion of the baseband received processing module 100-RX that includes the control module, the CP removal modules 304, 306, the time domain conversion modules 308, the equalizing module 310, the demapping modules 312, 314. The frequency and phase offset determining module 378 is further shown to include a compute SFO (sampling frequency offset) correction module 424, carrier PLL (phase locked loop) 422, a compute TD (time domain) correction module 426, a compute metrics module 416, a channel buffer 418, and a channel update module 420. The control module also includes a channel estimation module 382 and a channel buffer 384 which provides the channel estimation 336 to equalizing module 310.

Each of the CP remove modules 304, 306 that are activated receive the corresponding compensated symbol 322, 324 and remove there from a cyclic prefix based on information provided by the packet protocol control module 370. Accordingly, information provided by the packet control module 370 includes at least frame delineation information, and the tones and/or symbols which comprise the cyclic prefix. The cyclic prefix removal modules 304, 306 provide the cyclic prefix remove symbols to the corresponding domain conversion modules 308, 309.

Each of the domain conversion modules 308, 309 include a time domain correction module 400, 402 and a fast Fourier transform (FFT) module 404, 406. The time domain correction modules 400, 402 receive a time domain correction signal from the compute TD correction module 426 that adjusts for analog impairments and/or channel variations of the time domain signals. Accordingly, the time domain correction modules 400, 402 reduce the time domain errors caused by analog impairments and/or channel variations within the symbols. The FFT modules 404, 406 are operably coupled to convert the time domain symbols into frequency domain symbols.

The equalizing module 310 is operably coupled to equalize the frequency domain symbols in accordance with the channel estimation signal 336. The channel estimation module 382 monitors the compensated symbols 322, 324 to determine a corresponding channel response. The channel response is stored in channel buffer 384. The functionality of the channel estimation module 382 and equalizing module 310 may be further described in co-pending patent application Ser. No. 11/434,379 RX IMBALANCE ESTIMATION.

Each of the demapping modules 312 and 314 include a CPE (common phase error) and SFO (sampling frequency offset) compensation module 408, 410 and a symbol demapper 412, 414. The compute SFO correction module 424, within the phase and frequency offset determining module 378, monitors the carrier PLL 422 based on the coarse/fine frequency estimation module output 380 to produce the correction signal for the sampling frequency offset. In general, this results if the analog-to-digital conversion process is not in lock step with the clock of the received signal. The common phase error occurs as a result of phase rotation of the symbols, phase noise and/or carrier frequency offset. The compute metrics 416, based on information of the channel update 420 and channel buffer 418, provide the corresponding correction signals. As such, the CPE and SFO compensation modules 408 and 410 compensate for common phase error and/or sampling frequency offset of the received symbols.

The symbol demappers 412, 414 in accordance with the particular mode and mapping scheme as determined by the packet protocol module 370 demap the symbols to produce the interleaved data 344, 346.

Figure 11:
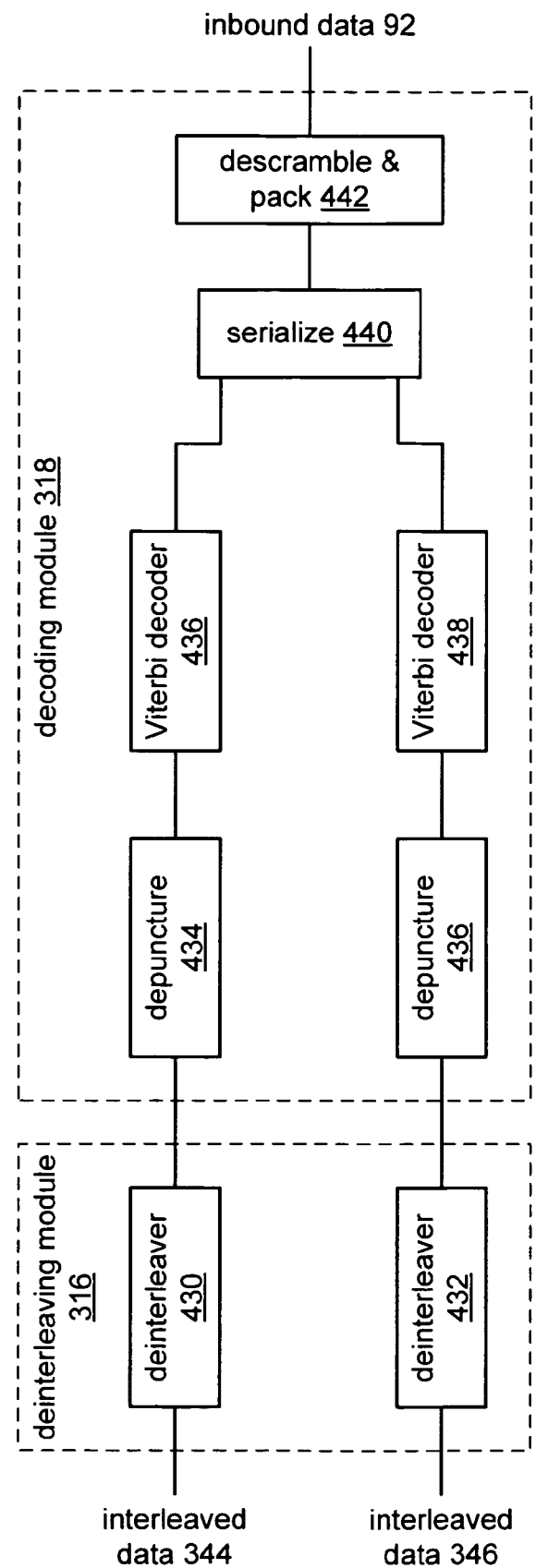
FIG. 11 is a schematic block diagram of yet another portion of a baseband receive processing module in accordance with the present invention.

FIG. 11 illustrates another portion of the baseband receive processing module 100-RX. In this illustration, the interleaving module 316 is shown to include a plurality of deinterleavers 430, 432 and the decoding module 318 is shown to include a plurality of depuncture modules 434, 436, plurality of VITERBI decoders 436, 438, a serialized module 440 and a packet and descrambler module 442.

Each of the deinterleavers 430, 432 that are activated for the particular mode, receive the interleaved data 344, 346 and deinterleave the corresponding data. The decoding module 318, via the depuncture modules 434, 436, which at least one is activated, receives the deinterleaved data and depunctures it in accordance with the mode and puncturing convention employed by the transmitter. The particular puncturing scheme is determined by the packet protocol module 370. The VITERBI decoders 436, 438 decode the depunctured data to produce decoded data. The serializing module 440 serializes the decoded data and provides it to the packet and descrambler module 442. The packet and descrambler module 442 packetizes and descrambles the data to produce the inbound data 92.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a multi-protocol programmable baseband transceiver processing module. As one of ordinary skill in the art will appreciate, other embodiments may be derived from the teaching of the present invention without deviating from the scope of the claims.

What is claimed is:

1. A multiple protocol wireless communication baseband transmit processing module capable of multiple input multiple output (MIMO) transmission or single antenna transmission comprises:

control module operably coupled to produce preamble set up information and payload set up information based on a control signal to select a mode from a plurality of communication protocol modes, including a single antenna transmission and a MIMO transmission using more than one antenna;

encoding module operably coupled to:

encode preamble data in accordance with the preamble set up information to produce encoded preamble data; and encode payload data in accordance with the payload set up information to produce encoded payload data;

interleaving module operably coupled to:

interleave the encoded preamble data in accordance with the preamble set up information to produce at least one stream of interleaved encoded preamble data; and interleave the encoded payload data in accordance with the payload set up information to produce at least one stream of interleaved encoded payload data;

a plurality of symbol mapping modules operably coupled to:
map, in accordance with the preamble set up information, the at least one stream of interleaved encoded preamble data to at least one stream of frequency domain preamble symbols; and
map, in accordance with the payload set up information, the at least one stream of interleaved encoded payload data to at least one stream of frequency domain payload symbols;

a plurality of domain conversion modules operably coupled to:
convert, in accordance with the preamble set up information, the at least one stream of frequency domain preamble symbols into at least one stream of time domain preamble symbols; and
convert, in accordance with the payload set up information, the at least one stream of frequency domain payload symbols into at least one stream of time domain payload symbols;

a plurality of cyclic prefix modules operably coupled to:
add, in accordance with the preamble set up information, a cyclic prefix to the at least one stream of time domain preamble symbols to produce at least one stream of preamble symbols; and
add a cyclic prefix to the at least one stream of time domain payload symbols to produce at least one stream of payload symbols; and a plurality of compensation modules operably coupled to:
compensate the at least one stream of preamble symbols to produce at least one stream of compensated preamble symbols; and
compensate the at least one stream of payload symbols to produce at least one stream of compensated payload symbols.

2. The multiple protocol wireless communication baseband transmit processing module of claim 1, wherein the control module comprises at least one of:
a medium access control (MAC) layer to physical (PHY) layer interface operably coupled to provide the payload data to the encoding module based on the mode;
a frame control module operably coupled to produce the preamble set up information and to produce the payload set up information based on the mode;
signal field generator operably coupled to provide a signal field corresponding to the mode, wherein the signal field is provided to the encoding module as the preamble data;
a long training sequence module operably coupled to provide a long training sequence corresponding to the mode, wherein the long training sequence is provided to the plurality symbol mapping module as part of the preamble set up information, such that the at least one stream of frequency domain preamble symbols includes a mapped representation of the long training sequence; and
a short training sequence module operably coupled to provide a short training sequence corresponding to the mode, wherein the short training sequence is provided to the plurality of cyclic prefix modules as part of the preamble set up information, wherein the at least one stream of preamble symbols includes a representation of the short training sequence.

3. The multiple protocol wireless communication baseband transmit processing module of claim 1, wherein the encoding module comprises:
a scrambler module operably coupled to scrambler the payload data in accordance with the payload set up information to produce scrambled data;
an encoder operably coupled to encode the scrambled data or a signal field of the preamble data in accordance with the payload set up information to produce encoded data; and
a puncture module operably coupled to puncture the encoded data in accordance with the payload set up information to produce the encoded payload data and the encoded preamble data.

4. The multiple protocol wireless communication baseband transmit processing module of claim 3, wherein the encoding module comprises:
the encoder including:
a serial to parallel converter operably coupled to convert a serial stream of the scrambled data into a plurality of streams of scrambled data; and
a plurality of coding units operably coupled to encode the plurality of streams of scrambler data to produce a plurality of streams of encoded data; and
the puncture module including:
a plurality of puncture units to puncture the plurality of streams of encoded data to produce a plurality of streams of punctured data; and
a parallel to serial module operably coupled to convert the plurality of streams of punctured data into the encoded payload data.

5. The multiple protocol wireless communication baseband transmit processing module of claim 4, wherein the encoding module comprises:
a legacy scrambler operably coupled to scrambler the payload data when the mode is a first mode of the plurality of the protocol modes to produce legacy scrambled data;
a legacy encoder operably coupled to encode the legacy scrambled data when the mode is the first mode to produce legacy encoded data; and
a legacy puncture module operably coupled to puncture the legacy encoded data when the mode is the first mode to produce legacy encoded payload data as the encoded payload data.

6. The multiple protocol wireless communication baseband transmit processing module of claim 1, wherein the control module functions to:
generate a first preamble set up information and a first payload set up information when the mode is an IEEE 802.11b mode of the plurality of protocol modes, wherein the first preamble set up information includes at least one of a synchronization field, a start of frame delimiter, a signal field, a service field, and a length field in accordance with the IEEE 802.11b, and wherein the first payload set up information includes transmit power;
generate a second preamble set up information and a second payload set up information when the mode is an IEEE 802.11a mode of the plurality of protocol modes, wherein the second preamble set up information includes at least one of a short training sequence, a long training sequence, a signal field, a service field, and a frame length field in accordance with the IEEE 802.11a and wherein the second payload set up information includes transmit power, encoding scheme, puncture rate, data rate, modulation scheme, and path selection;
generate a third preamble set up information and a third payload set up information when the mode is an IEEE 802.11g mode of the plurality of protocol modes, wherein the third preamble set up information includes at least one of a short training sequence, a long training sequence, a signal field, a service field, and a frame length field in accordance with the IEEE 802.11g and wherein the second payload set up information includes transmit power, encoding scheme, puncture rate, data rate, modulation scheme, and path selection; and generate a fourth preamble set up information and a fourth payload set up information when the mode is a MIMO mode of the plurality of protocol modes, wherein the fourth preamble set up information includes at least one of a short training sequence, a long training sequence, a signal field, a service field, and a frame length field in accordance with the MIMO mode and wherein the second payload set up information includes transmit power, encoding scheme, puncture rate, data rate, modulation scheme, number of transmit paths, and path selection.

7. The multiple protocol wireless communication baseband transmit processing module of claim 1, wherein each of the plurality of compensation modules comprises:
a baseband multiplier operably coupled to:
multiple a scaling factor with a corresponding one of the at least one stream of preamble symbols to produce a scaled stream of preamble symbols; and
multiple the scaling factor with a corresponding one of the at least one stream of payload symbols to produce a scaled stream of payload symbols; and
an in-phase and quadrature module operably coupled to:
compensate for in-phase and quadrature imbalances of the scaled stream of preamble symbols to produce a corresponding one of the at least one stream of compensated preamble symbols; and
compensate for the in-phase and quadrature imbalances of the scaled stream of payload symbols to produce a corresponding one of the at least one stream of compensated payload symbols.

8. A multiple protocol wireless communication baseband receive processing module capable of multiple input multiple output (MIMO) reception or single antenna reception comprises:
a plurality of compensation module operably coupled to compensate at least one received stream of symbols in accordance with compensation control signals to produce at least one stream of compensated symbols;
a plurality of cyclic prefix removal modules operably coupled to remove, in accordance with a mode from a plurality of communication protocol modes that include a single antenna reception and a MIMO reception using more than one antenna, a cyclic prefix from fields of the at least one stream of compensated symbols to produce at least one stream of cyclic prefix removed symbols;
a plurality of domain conversion modules operably coupled to convert, in accordance with the mode of a plurality of protocol modes, the at least one stream of cyclic prefix removed symbols from a time domain to a frequency domain to produce at least one stream of frequency domain symbols;
an equalizing module operably coupled to equalize the at least one stream of frequency domain symbols based on a channel estimation to produce at least one stream of equalized frequency domain symbols;
a plurality of demapping modules operably coupled to demap the at least one stream of equalized frequency domain symbols in accordance with the mode of the plurality of protocol modes to produce at least one stream of interleaved data;
a deinterleaving module operably coupled to deinterleave, in accordance with the mode of the plurality of protocol modes, the at least one stream of interleaved data to produce encoded data;
a decoding module operably coupled to decode, in accordance with the mode of the plurality of protocol modes, the encoded data to produce data; and
a control module operably coupled to determine the mode from the plurality of protocol modes and the compensation control signals based on the at least one compensated stream of symbols, the control module also including a power compensation module to compute power of the at least one received stream of symbols and a gain control module to adjust receiver gain based on the computed power.

9. The multiple protocol wireless communication baseband receive processing module of claim 8, wherein each of the plurality of compensation modules comprises at least one of:
DC offset module operably coupled to compensate for DC offset of a corresponding one of the at least one of the received stream of symbols;
an in-phase (I) and quadrature (Q) compensation module operably coupled to compensate for in-phase and quadrature imbalance of a corresponding one of the at least one of the received stream of symbols in accordance with an IQ imbalance estimation of the compensation control signals to produce at least one stream of IQ balanced symbols;
frequency correction module operably coupled to compensate for a sampling frequency offset of the at least one stream of IQ balanced symbols in accordance with a sampling frequency offset value of the compensation control signals to produce at least one stream of frequency compensated symbols; and
a filtering module operably coupled to filter the at least one stream of frequency compensated symbols to produce the at least one stream of compensated symbols.

10. The multiple protocol wireless communication baseband receive processing module of claim 8, wherein each of the plurality of domain conversion modules comprises:
a time domain correction module operably coupled to compensate a corresponding one of the at least one stream of cyclic prefix removed symbols for a time domain offset to produce a stream of time domain offset compensated symbols; and
a fast Fourier transform (FFT) module operably coupled to convert the stream of time domain offset compensated symbols into a corresponding one of the at least one stream of frequency domain symbols.

11. The multiple protocol wireless communication baseband receive processing module of claim 8, wherein each of the plurality of demapping modules comprises:
a common phase error and sampling frequency offset compensation module operably coupled to compensate a corresponding one of the at least one stream of equalized frequency domain symbols for at least one of common phase error and sampling frequency offset to produce a stream of phase and frequency compensated symbols; and
a symbol demapper operably coupled to demap the stream of phase and frequency compensated symbols to produce a corresponding one of the at least one of interleaved data.

12. The multiple protocol wireless communication baseband receive processing module of claim 8, wherein the control module comprises:

a plurality of in-phase (I) and quadrature (Q) imbalance estimation modules operably coupled to determine IQ imbalance in each of the least one received stream of symbols to produce an IQ imbalance estimation therefrom;

packet protocol control module operably coupled to determine the mode from the plurality of protocol modes based on a preamble format of the at least one stream of compensated symbols; and frequency and phase offset determining module operably coupled to determine a frequency offset and a phase offset based on at lest one of the least one stream of compensated symbols, the at least one stream of interleaved symbols, and the at least one stream of equalized frequency domain symbols.

13. A multi-protocol wireless communication baseband transceiver capable of multiple input multiple output (MIMO) transmission and reception and capable of single antenna transmission and reception comprises:

a baseband transmit processing module including:

a transmit control module operably coupled to produce preamble set up information and payload set up information based on a control signal to select a mode from a plurality of communication protocol modes, including a single antenna transmission and a MIMO transmission using more than one antenna;

encoding module operably coupled to:
encode preamble data in accordance with the preamble set up information to produce encoded preamble data; and
encode payload data in accordance with the payload set up information to produce encoded payload data;

interleaving module operably coupled to:
interleave the encoded preamble data in accordance with the preamble set up information to produce at least one stream of interleaved encoded preamble data; and
interleave the encoded payload data in accordance with the payload set up information to produce at least one stream of interleaved encoded payload data;

a plurality of symbol mapping modules operably coupled to:
map, in accordance with the preamble set up information, the at least one stream of interleaved encoded preamble data to at least one stream of frequency domain preamble symbols; and
map, in accordance with the payload set up information, the at least one stream of interleaved encoded payload data to at least one stream of frequency domain payload symbols;

a plurality of domain conversion modules operably coupled to:
convert, in accordance with the preamble set up information, the at least one stream of frequency domain preamble symbols into at least one stream of time domain preamble symbols; and
convert, in accordance with the payload set up information, the at least one stream of frequency domain payload symbols into at least one stream of time domain payload symbols;

a plurality of cyclic prefix modules operably coupled to:
add, in accordance with the preamble set up information, a cyclic prefix to the at least one stream of time domain preamble symbols to produce at least one stream of preamble symbols; and
add a cyclic prefix to the at least one stream of time domain payload symbols to produce at least one stream of payload symbols; and a plurality of compensation modules operably coupled to:
compensate the at least one stream of preamble symbols to produce at least one stream of compensated preamble symbols; and
compensate the at least one stream of payload symbols to produce at least one stream of compensated payload symbols; and a baseband receive processing module including:
a plurality of receive compensation module operably coupled to compensate at least one received stream of symbols in accordance with compensation control signals to produce at least one stream of compensated symbols;

a plurality of cyclic prefix removal modules operably coupled to remove, in accordance with a mode of the plurality of communication protocol modes that include a single antenna reception and a MIMO reception using more than one antenna, a cyclic prefix from fields of the at least one stream of compensated symbols to produce at least one stream of cyclic prefix removed symbols;

a plurality of receive domain conversion modules operably coupled to convert, in accordance with the mode of the plurality of protocol modes, the at least one stream of cyclic prefix removed symbols from a time domain to a frequency domain to produce at least one stream of frequency domain symbols;

an equalizing module operably coupled to equalize the at least one stream of frequency domain symbols based on a channel estimation to produce at least one stream of equalized frequency domain symbols;

a plurality of demapping modules operably coupled to demap the at least one stream of equalized frequency domain symbols in accordance with the mode of the plurality of protocol modes to produce at least one stream of interleaved data;

a deinterleaving module operably coupled to deinterleave, in accordance with the mode of the plurality of protocol modes, the at least one stream of interleaved data to produce encoded data;

a decoding module operably coupled to decode, in accordance with the mode of the plurality of protocol modes, the encoded data to produce data; and a receive control module operably coupled to determine the mode from the plurality of protocol modes and the compensation control signals based on the at least one compensated stream of symbols, the receive control module also including a power compensation module to compute power of the at least one received stream of symbols and a gain control module to adjust receiver gain based on the computed power.

14. The multi-protocol wireless communication baseband transceiver of claim 13, wherein the transmit control module comprises at least one of:

a medium access control (MAC) layer to physical (PHY) layer interface operably coupled to provide the payload data to the encoding module based on the mode;

a frame control module operably coupled to produce the preamble set up information and to produce the payload set up information based on the mode based on the mode;

signal field generator operably coupled to provide a signal field corresponding to the mode, wherein the signal field is provided to the encoding module as the preamble data;

a long training sequence module operably coupled to provide a long training sequence corresponding to the mode, wherein the long training sequence is provided to the plurality symbol mapping module as part of the preamble set up information, such that the at least one stream of frequency domain preamble symbols includes a mapped representation of the long training sequence; and a short training sequence module operably coupled to provide a short training sequence corresponding to the mode, wherein the short training sequence is provided to the plurality of cyclic prefix modules as part of the preamble set up information, wherein the at least one stream of preamble symbols includes a representation of the short training sequence.

15. The multi-protocol wireless communication baseband transceiver of claim 13, wherein the transmit control module functions to:

generate a first preamble set up information and a first payload set up information when the mode is an IEEE 802.11b mode of the plurality of protocol modes, wherein the first preamble set up information includes at least one of a synchronization field, a start of frame delimiter, a signal field, a service field, and a length field in accordance with the IEEE 802.11b, and wherein the first payload set up information includes transmit power;

generate a second preamble set up information and a second payload set up information when the mode is an IEEE 802.11a mode of the plurality of protocol modes, wherein the second preamble set up information includes at least one of a short training sequence, a long training sequence, a signal field, a service field, and a frame length field in accordance with the IEEE 802.11a and wherein the second payload set up information includes transmit power and path selection;

generate a third preamble set up information and a third payload set up information when the mode is an IEEE 802.11g mode of the plurality of protocol modes, wherein the third preamble set up information includes at least one of a short training sequence, a long training sequence, a signal field, a service field, and a frame length field in accordance with the IEEE 802.11g and wherein the second payload set up information includes transmit power and path selection; and generate a fourth preamble set up information and a fourth payload set up information when the mode is a MIMO mode of the plurality of protocol modes, wherein the fourth preamble set up information includes at least one of a short training sequence, a long training sequence, a signal field, a service field, and a frame length field in accordance with the MIMO mode and wherein the second payload set up information includes transmit power, number of transmit paths, and path selection.

16. The multi-protocol wireless communication baseband transceiver of claim 13, wherein each of the plurality of compensation modules comprises:

a baseband multiplier operably coupled to:
multiple a scaling factor with a corresponding one of the at least one stream of preamble symbols to produce a scaled stream of preamble symbols; and
multiple the scaling factor with a corresponding one of the at least one stream of payload symbols to produce a scaled stream of payload symbols; and an in-phase and quadrature module operably coupled to:
compensate for in-phase and quadrature imbalances of the scaled stream of preamble symbols to produce a corresponding one of the at least one stream of compensated preamble symbols; and
compensate for the in-phase and quadrature imbalances of the scaled stream of payload symbols to produce a corresponding one of the at least one stream of compensated payload symbols.

17. The multi-protocol wireless communication baseband transceiver of claim 13, wherein the encoding module comprises:

a scrambler module operably coupled to scrambler the payload data in accordance with the payload set up information to produce scrambled data;

an encoder operably coupled to encode the scrambled data or a signal field of the preamble data in accordance with the payload set up information to produce encoded data, wherein the encoder includes:
a serial to parallel converter operably coupled to convert a serial stream of the scrambled data into a plurality of streams of scrambled data; and
a plurality of coding units operably coupled to encode the plurality of streams of scrambler data to produce a plurality of streams of encoded data;

a puncture module operably coupled to puncture the encoded data in accordance with the payload set up information to produce the encoded payload data and the encoded preamble data, wherein the puncture module includes:
a plurality of puncture units to puncture the plurality of streams of encoded data and to produce a plurality of streams of punctured data; and
a parallel to serial module operably coupled to convert the plurality of streams of punctured data into the encoded payload data;

a legacy scrambler operably coupled to scrambler the payload data when the mode is a first mode of the plurality of the protocol modes to produce legacy scrambled data;

a legacy encoder operably coupled to encode the legacy scrambled data when the mode is the first mode to produce legacy encoded data; and a legacy puncture module operably coupled to puncture the legacy encoded data when the mode is the first mode to produce legacy encoded payload data as the encoded payload data.

18. The multi-protocol wireless communication baseband transceiver of claim 13, wherein each of the plurality of receive compensation modules comprises at least one of:

DC offset module operably coupled to compensate for DC offset of a corresponding one of the at least one of the received stream of symbols;

an in-phase (I) and quadrature (Q) compensation module operably coupled to compensate for in-phase and quadrature imbalance of a corresponding one of the at least one of the received stream of symbols in accordance with an IQ imbalance estimation of the compensation control signals to produce at least one stream of IQ balanced symbols;

frequency correction module operably coupled to compensate for a sampling frequency offset of the at least one stream of IQ balanced symbols in accordance with a sampling frequency offset value of the compensation control signals to produce at least one stream of frequency compensated symbols; and a filtering module operably coupled to filter the at least one stream of frequency compensated symbols to produce the at least one stream of compensated symbols.

19. The multi-protocol wireless communication baseband transceiver of claim 13, wherein each of the plurality of receive domain conversion modules comprises:
   a time domain correction module operably coupled to compensate a corresponding one of the at least one stream of cyclic prefix removed symbols for a time domain offset to produce a stream of time domain offset compensated symbols; and
   a fast Fourier transform (FFT) module operably coupled to convert the stream of time domain offset compensated symbols into a corresponding one of the at least one stream of frequency domain symbols.

20. The multi-protocol wireless communication baseband transceiver of claim 13, wherein the receive control module comprises:

a plurality of in-phase (I) and quadrature (Q) imbalance estimation modules operably coupled to determine IQ imbalance in each of the least one received stream of symbols to produce an IQ imbalance estimation therefrom;

packet protocol control module operably coupled to determine the mode from the plurality of protocol modes based on a preamble format of the at least one stream of compensated symbols; and frequency and phase offset determining module operably coupled to determine a frequency offset and a phase offset based on at lest one of the least one stream of compensated symbols, the at least one stream of interleaved symbols, and the at least one stream of equalized frequency domain symbols.

* * * * *

UNITED STATES PATENT AND TRADEMARK OFFICE
CERTIFICATE OF CORRECTION

PATENT NO. : 7,813,374 B2
APPLICATION NO. : 11/433997
DATED : October 12, 2010
INVENTOR(S) : Rajendra Tushar Moorti et al.

It is certified that error appears in the above-identified patent and that said Letters Patent is hereby corrected as shown below:

Col. 18, line 4, in Claim 3: after "coupled to", delete "scrambler" and insert --scramble--

Col. 18, line 35, in Claim 5: after "coupled to", delete "scrambler" and insert --scramble--

Col. 21, line 3, in Claim 12: after "each of the", insert --at--

Col. 21, line 12, in Claim 12: replace "lest" with --least-- and, after "one of the", insert --at--

Col. 24, line 13, in Claim 17: after "coupled to", delete "scrambler" and insert --scramble--

Col. 26, line 3, in Claim 20: after "each of the", insert --at--

Col. 26, line 12, in Claim 20: replace "lest" with --least-- and, after "one of the", insert --at--

Signed and Sealed this
Fifteenth Day of May, 2012

David J. Kappos
*Director of the United States Patent and Trademark Office*